United States Patent
Miller et al.

(10) Patent No.: US 8,972,854 B2
(45) Date of Patent: *Mar. 3, 2015

(54) GRAPHICAL CREATION OF A DOCUMENT CONVERSION TEMPLATE

(75) Inventors: Robert G. Miller, Lawrenceville, GA (US); Michael Rosenorn, Soborg (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 913 days.

This patent is subject to a terminal disclaimer.

(21) Appl. No.: 13/160,368

(22) Filed: Jun. 14, 2011

(65) Prior Publication Data

US 2011/0283182 A1 Nov. 17, 2011

Related U.S. Application Data

(63) Continuation of application No. 11/864,308, filed on Sep. 28, 2007, now Pat. No. 7,979,793.

(51) Int. Cl.
*G06F 17/00* (2006.01)
*G06F 17/22* (2006.01)

(52) U.S. Cl.
CPC .......... *G06F 17/2247* (2013.01); *G06F 17/227* (2013.01)
USPC .......................................... 715/255; 715/249

(58) Field of Classification Search
USPC .......................................... 715/200, 255, 249
See application file for complete search history.

(56) References Cited

U.S. PATENT DOCUMENTS 5,283,887 A 2/1994 Zachery
5,819,293 A * 10/1998 Comer et al. ..................... 1/1
6,668,354 B1 12/2003 Chen et al.
7,146,565 B2 12/2006 Toyama et al.
7,191,395 B2 3/2007 Adler et al.
7,246,305 B2 7/2007 Batres
7,281,018 B1 * 10/2007 Begun et al. ..................... 1/1
7,315,981 B2 1/2008 Nakamura et al.
7,318,200 B2 * 1/2008 Maur et al. ..................... 715/765
7,493,260 B2 * 2/2009 Harb et al. ..................... 704/270
7,653,876 B2 * 1/2010 Ethier et al. ..................... 715/249

(Continued)

FOREIGN PATENT DOCUMENTS

WO WO-/2007/063582 6/2007

OTHER PUBLICATIONS

Diaz et al., Inter-organizational Document Exchange—Facing the Conversion Problem with XML—, ACM 2002, pp. 1043-1047.*

(Continued)

*Primary Examiner* — Cong-Lac Huynh
(74) *Attorney, Agent, or Firm* — Damon Rieth; Brian Haslam; Micky Minhas

(57) ABSTRACT

The template creation system enables a graphical selection of one or more fields from within a database system. The template creation system identifies a source format of the received fields that can be exported from the database system. The template creation system identifies a target format readable by a document editing system. For example, the document editing system may be a word processing application that stores files in an application-specific format. The template creation system creates one or more template rules based on the identified source and target formats for converting the data from the source format to the target format. The template rules may then be stored in an XSLT style sheet.

20 Claims, 14 Drawing Sheets

(56) References Cited

U.S. PATENT DOCUMENTS

| | | | |
|---|---|---|---|
| 7,721,200 B2* | 5/2010 | Grigoriadis et al. | 715/243 |
| 7,877,683 B2 | 1/2011 | Cornacchia, III | |
| 8,717,384 B1* | 5/2014 | Wirtz et al. | 345/629 |
| 2002/0091776 A1 | 7/2002 | Nolan et al. | |
| 2003/0037076 A1 | 2/2003 | Bravery et al. | |
| 2003/0084405 A1 | 5/2003 | Ito et al. | |
| 2003/0093760 A1 | 5/2003 | Suzuki et al. | |
| 2003/0140053 A1* | 7/2003 | Vasey | 707/100 |
| 2004/0006738 A1* | 1/2004 | Szabo et al. | 715/513 |
| 2004/0064783 A1* | 4/2004 | Braun et al. | 715/500 |
| 2004/0205531 A1 | 10/2004 | Innes et al. | |
| 2005/0004885 A1* | 1/2005 | Pandian et al. | 707/1 |
| 2005/0021548 A1 | 1/2005 | Bohannon et al. | |
| 2005/0055332 A1* | 3/2005 | Vasey | 707/1 |
| 2005/0060317 A1 | 3/2005 | Lott et al. | |
| 2005/0086584 A1 | 4/2005 | Sampathkumar et al. | |
| 2005/0149536 A1 | 7/2005 | Wildes et al. | |
| 2005/0160359 A1 | 7/2005 | Falk et al. | |
| 2006/0010377 A1* | 1/2006 | Anecki et al. | 715/530 |
| 2006/0031762 A1 | 2/2006 | Takashima | |
| 2006/0101329 A1 | 5/2006 | Han et al. | |
| 2006/0284981 A1 | 12/2006 | Erol et al. | |
| 2007/0009161 A1* | 1/2007 | Hollingsworth | 382/229 |
| 2007/0124323 A1 | 5/2007 | Hackworth et al. | |
| 2007/0162848 A1 | 7/2007 | Mansfield et al. | |
| 2008/0086507 A1* | 4/2008 | Szygenda et al. | 707/104.1 |
| 2008/0097789 A1 | 4/2008 | Huffer | |
| 2008/0098299 A1 | 4/2008 | Odagiri et al. | |
| 2008/0098301 A1 | 4/2008 | Black et al. | |
| 2008/0104493 A1* | 5/2008 | Rees et al. | 715/200 |
| 2008/0104508 A1* | 5/2008 | Lumley et al. | 715/255 |
| 2008/0115051 A1 | 5/2008 | Mauceri et al. | |
| 2008/0115104 A1* | 5/2008 | Quinn | 717/101 |
| 2008/0222517 A1 | 9/2008 | Halim et al. | |
| 2008/0222636 A1 | 9/2008 | Wang et al. | |
| 2008/0306784 A1* | 12/2008 | Rajkumar et al. | 705/7 |
| 2009/0076954 A1* | 3/2009 | Carmody et al. | 705/40 |
| 2009/0125428 A1 | 5/2009 | Conklin et al. | |
| 2009/0177961 A1 | 7/2009 | Fortini et al. | |
| 2009/0248740 A1 | 10/2009 | McCormack et al. | |
| 2009/0327321 A1* | 12/2009 | McCormack et al. | 707/101 |
| 2010/0318511 A1* | 12/2010 | Phan et al. | 707/722 |

OTHER PUBLICATIONS

"Free osCommerce Stylesheet Creation Tool osCommerce Watch," http://watchoscommerce.co.nz//buzz.php?buzz_id=94, downloaded Jul. 18, 2007 (1 page).

"Signs on the Sand: Microsoft Word as XSL-FO visual editor?" http://www.tkachenko.com/blog/archives/000394.html, downloaded Jul. 18, 2007 (2 pages).

"Stylemaker—Download—TotalShareware Software Archive," http://www.totalshareware.com/asp/detail_view.asp?application=15202, downloaded Jul. 18, 2007 (1 page).

Aalberg, "A Procwess and Tool for the Conversion of MARC Records to a Normalized FRBR Implementation," Google 2006, pp. 283-292.

Bloechle et al., XCDF: A Canonical and Structured Document Format,: Google 2006, pp. 141-152.

Jones, A. Russell, "Export Customized XML from Microsoft Word with VB.NET," http://www.xml.com/pub/a/2003/12/31/qa.html, Sep. 18, 2003, downloaded Jul. 18, 2007 (3 pages).

Lujan-Mora et al., "A Web-Oriented Approach to Manage Multidimensional Models Through XML Schemas and XLST," Google 2002, pp. 29-44.

Myllymaki, "Effective Web Data Extraction with Standard XML Technologies," Computer Networks 2002, pp. 635-644.

Riva et al., "Generation of Architectural Documentation Using XML," IEEE 2002, pp. 1-9.

Shu et al., "Convert: A High level Translation Definition Language for Data Conversion," ACM Oct. 1975, pp. 557-567.

Simpson, John E., "From Work to XML," http://xml.com/pub/a/2003/12/31/qa.html, Dec. 30, 2003, downloaded Jul. 18, 2007 (10 pages).

* cited by examiner

FIG. 4C

```xml
<?xml version="1.0" encoding="UTF-8" standalone="yes"?>
<?mso-application progid="Word.Document"?>

<w:wordDocument
 xmlns:o="urn:schemas-microsoft-com:office:office"
 xmlns:v="urn:schemas-microsoft-com:vml"
 xmlns:w="http://schemas.microsoft.com/office/word/2003/wordml">

<w:body>

<w:pict><v:imagedata src="wordml://02000001.jpg" o:title="contoso logo"/></w:pict>
<w:fldChar><w:instrText> MERGEFIELD DataLink </w:instrText>«DataLink»</w:fldChar>
<w:fldSimple w:instr=" MERGEFIELD WorkDate ">«WorkDate»</w:fldSimple>

<w:tbl>
  <w:tr>
    <w:tc>Customer Name</w:tc>
    <w:tc><w:fldSimple w:instr=" MERGEFIELD SH_Billto_Name ">«SH_Billto_Name»</w:fldSimple></w:tc>
    <w:tc>Document No.</w:tc>
    <w:tc><w:fldSimple w:instr=" MERGEFIELD SIL_Doc_No ">«SIL_Doc_No»</w:fldSimple></w:tc>
  </w:tr>
  <w:tr>
    <w:tc>Address</w:tc>
    <w:tc><w:fldSimple w:instr=" MERGEFIELD SH_Billto_Address ">«SH_Billto_Address»</w:fldSimple></w:tc>
    <w:tc>Service Item No.</w:tc>
    <w:tc><w:fldSimple w:instr=" MERGEFIELD SIL_Svc_Item_No ">«SIL_Svc_Item_No»</w:fldSimple></w:tc>
  </w:tr>
  <w:tr>
    <w:tc>City</w:tc>
    <w:tc><w:fldSimple w:instr=" MERGEFIELD SH_Billto_City ">«SH_Billto_City»</w:fldSimple></w:tc>
    <w:tc>Item No.</w:tc>
    <w:tc><w:fldSimple w:instr=" MERGEFIELD SIL_Item_No ">«SIL_Item_No»</w:fldSimple></w:tc>
  </w:tr>
  <w:tr>
    <w:tc>Country</w:tc>
    <w:tc><w:fldSimple w:instr=" MERGEFIELD SH_CountryRgn_Code ">«SH_CountryRgn_Code»</w:fldSimple></w:tc>
    <w:tc>Serial No.</w:tc>
    <w:tc><w:fldSimple w:instr=" MERGEFIELD SIL_Serial_No ">«SIL_Serial_No»</w:fldSimple></w:tc>
  </w:tr>
  <w:tr>
    <w:tc>Contact</w:tc>
    <w:tc><w:fldSimple w:instr=" MERGEFIELD SH_Billto_Contact ">«SH_Billto_Contact»</w:fldSimple></w:tc>
    <w:tc>Service Shelf No.</w:tc>
    <w:tc><w:fldSimple w:instr=" MERGEFIELD SIL_Svc_Shelf_No ">«SIL_Svc_Shelf_No»</w:fldSimple></w:tc>
  </w:tr>
</w:tbl>

<w:fldSimple w:instr=" MERGEFIELD MULTILINE_BEGIN_Svc_Line ">«MULTILINE_BEGIN_Svc_Line»</w:fldSimple>

<w:tbl>
  <w:tr>
    <w:tc><w:fldSimple w:instr=" MERGEFIELD CAPTION_SL_Type ">«CAPTION_SL_Type»</w:fldSimple></w:tc>
    <w:tc><w:fldSimple w:instr=" MERGEFIELD CAPTION_SL_No ">«CAPTION_SL_No»</w:fldSimple></w:tc>
    <w:tc><w:fldSimple w:instr=" MERGEFIELD CAPTION_SL_Desc ">«CAPTION_SL_Desc»</w:fldSimple></w:tc>
    <w:tc><w:fldSimple w:instr=" MERGEFIELD CAPTION_SL_Loc_Code ">«CAPTION_SL_Loc_Code»</w:fldSimple></w:tc>
    <w:tc><w:fldSimple w:instr=" MERGEFIELD CAPTION_SL_UnitType ">«CAPTION_SL_UnitType»</w:fldSimple></w:tc>
    <w:tc><w:fldSimple w:instr=" MERGEFIELD CAPTION_SL_Quantity ">«CAPTION_SL_Quantity»</w:fldSimple></w:tc>
  </w:tr>
  <w:tr>
    <w:tc><w:fldSimple w:instr=" MERGEFIELD SL_Type ">«SL_Type»</w:fldSimple></w:tc>
    <w:tc><w:fldSimple w:instr=" MERGEFIELD SL_No ">«SL_No»</w:fldSimple></w:tc>
    <w:tc><w:fldSimple w:instr=" MERGEFIELD SL_Desc ">«SL_Desc»</w:fldSimple></w:tc>
    <w:tc><w:fldSimple w:instr=" MERGEFIELD SL_Loc_Code ">«SL_Loc_Code»</w:fldSimple></w:tc>
    <w:tc><w:fldSimple w:instr=" MERGEFIELD SL_UnitType ">«SL_UnitType»</w:fldSimple></w:tc>
    <w:tc><w:fldSimple w:instr=" MERGEFIELD SL_Quantity ">«SL_Quantity»</w:fldSimple></w:tc>
  </w:tr>
</w:tbl>

<w:fldSimple w:instr=" MERGEFIELD MULTILINE_END_Svc_Line ">«MULTILINE_END_Svc_Line»</w:fldSimple>

</w:body>

</w:wordDocument>
```

*FIG. 8A*

```xml
<?xml version="1.0" encoding="UTF-8" standalone="yes"?>

<xsl:stylesheet version="1.0"
  xmlns:xsl="http://www.w3.org/1999/XSL/Transform"
  xmlns:w="http://schemas.microsoft.com/office/word/2003/wordml"
  xmlns:v="urn:schemas-microsoft-com:vml"
  xmlns:o="urn:schemas-microsoft-com:office:office">

<xsl:output method="xml" encoding="UTF-8" standalone="yes"/>
<xsl:template match="/">
    <xsl:processing-instruction name="mso-application">progid="Word.Document"</xsl:processing-instruction>

<w:wordDocument
       xmlns:w="http://schemas.microsoft.com/office/word/2003/wordml"
       xmlns:v="urn:schemas-microsoft-com:vml"
       xmlns:o="urn:schemas-microsoft-com:office:office">

<w:body>
    <w:pict><v:shape><v:imagedata src="wordml://02000001.jpg" o:title="contoso logo"/></v:shape></w:pict>
    <w:hlink>
        <xsl:attribute name="w:dest"><xsl:value-of select="//Object/@url"/></xsl:attribute>
        <xsl:attribute name="w:screenTip">Link to Microsoft Dynamics NAV</xsl:attribute>
        Service Item Worksheet Pick List
    </w:hlink>
    <xsl:value-of select="Object/WorkDate"/>

<w:tbl>
       <w:tr>
          <w:tc>Customer Name</w:tc>
          <w:tc><xsl:value-of select="Object/ServiceHeader/Data/BilltoName"/></w:tc>
          <w:tc>Document No.</w:tc>
          <w:tc><xsl:value-of select="Object/ServiceItemLine/Data/DocumentNo"/></w:tc>
       </w:tr>
       <w:tr>
          <w:tc>Address</w:tc>
          <w:tc><xsl:value-of select="Object/ServiceHeader/Data/BilltoAddress"/></w:tc>
          <w:tc>Service Item No.</w:tc>
          <w:tc><xsl:value-of select="Object/ServiceItemLine/Data/ServiceItemNo"/></w:tc>
       </w:tr>
       <w:tr>
          <w:tc>City</w:tc>
          <w:tc><xsl:value-of select="Object/ServiceHeader/Data/BilltoCity"/></w:tc>
          <w:tc>Item No.</w:tc>
          <w:tc><xsl:value-of select="Object/ServiceItemLine/Data/ItemNo"/></w:tc>
       </w:tr>
       <w:tr>
          <w:tc>Country</w:tc>
          <w:tc><xsl:value-of select="Object/ServiceHeader/Data/CountryRegionCode"/></w:tc>
          <w:tc>Serial No.</w:tc>
          <w:tc><xsl:value-of select="Object/ServiceItemLine/Data/SerialNo"/></w:tc>
       </w:tr>
       <w:tr>
          <w:tc>Contact</w:tc>
          <w:tc><xsl:value-of select="Object/ServiceHeader/Data/BilltoContact"/></w:tc>
          <w:tc>Service Shelf No.</w:tc>
          <w:tc><xsl:value-of select="Object/ServiceItemLine/Data/ServiceShelfNo"/></w:tc>
       </w:tr>
    </w:tbl>
    <w:tbl>
       <w:tr>
          <w:tc><xsl:value-of select="Object/ServiceLine/Caption/Type/@caption"/></w:tc>
          <w:tc><xsl:value-of select="Object/ServiceLine/Caption/No/@caption"/></w:tc>
          <w:tc><xsl:value-of select="Object/ServiceLine/Caption/Description/@caption"/></w:tc>
          <w:tc><xsl:value-of select="Object/ServiceLine/Caption/LocationCode/@caption"/></w:tc>
          <w:tc><xsl:value-of select="Object/ServiceLine/Caption/UnitofMeasure/@caption"/></w:tc>
          <w:tc><xsl:value-of select="Object/ServiceLine/Caption/Quantity/@caption"/></w:tc>
       </w:tr>
       <xsl:for-each select="Object/ServiceLine/Data/Row">
          <w:tr>
              <w:tc><xsl:value-of select="Type"/></w:tc>
              <w:tc><xsl:value-of select="No"/></w:tc>
              <w:tc><xsl:value-of select="Description"/></w:tc>
              <w:tc><xsl:value-of select="LocationCode"/></w:tc>
              <w:tc><xsl:value-of select="UnitofMeasure"/></w:tc>
              <w:tc><xsl:value-of select="Quantity"/></w:tc>
          </w:tr>
       </xsl:for-each>
    </w:tbl>
    </w:body>
    </w:wordDocument>

</xsl:template>
</xsl:stylesheet>
```

*FIG. 8B*

```xml
<?xml version="1.0" encoding="UTF-8" standalone="no"?>
<Object url="navision://client/run?database=...">
<ServiceItemLine>
  <Caption>
  ...
  </Caption>
  <Data>
     <DocumentNo>SO000001</DocumentNo>
     <LineNo>10000</LineNo>
     <ServiceItemNo>7</ServiceItemNo>
     <ItemNo>80007</ItemNo>
     <SerialNo>AS764789</SerialNo>
     <ServiceShelfNo></ServiceShelfNo>
     <CustomerNo></CustomerNo>
  </Data>
</ServiceItemLine>

<ServiceHeader>
  <Caption>
  ...
  </Caption>
  <Data>
     <DocumentType>Order</DocumentType>
     <CustomerNo>10000</CustomerNo>
     <No>SO000001</No>
     <BilltoName>The Cannon Group PLC</BilltoName>
     <BilltoAddress>192 Market Square</BilltoAddress>
     <BilltoCity>Birmingham</BilltoCity>
     <BilltoContact>Mr. Andy Teal</BilltoContact>
     <CountryRegionCode>GB</CountryRegionCode>
  </Data>
</ServiceHeader>

<ServiceLine>
  <Caption>
     <DocumentType caption="Document Type"></DocumentType>
     <CustomerNo caption="Customer No."></CustomerNo>
     <DocumentNo caption="Document No."></DocumentNo>
     <LineNo caption="Line No."></LineNo>
     <Type caption="Type"></Type>
     <No caption="No."></No>
     <LocationCode caption="Location Code"></LocationCode>
     <Description caption="Description"></Description>
     <UnitofMeasure caption="Unit of Measure"></UnitofMeasure>
     <Quantity caption="Quantity"></Quantity>
  </Caption>
  <Data>
     <Row>
        <DocumentType>Order</DocumentType>
        <CustomerNo>10000</CustomerNo>
        <DocumentNo>SO000001</DocumentNo>
        <LineNo>10000</LineNo><Type>Item</Type>
        <No>80202</No><LocationCode>BLUE</LocationCode>
        <Description>Chip 32 MB</Description>
        <UnitofMeasure>Piece</UnitofMeasure>
        <Quantity>1</Quantity>
     </Row>
     <Row>
        <DocumentType>Order</DocumentType>
        <CustomerNo>10000</CustomerNo>
        <DocumentNo>SO000001</DocumentNo>
        <LineNo>20000</LineNo>
        <Type>Resource</Type>
        <No>LINDA</No>
        <LocationCode>BLUE</LocationCode>
        <Description>Linda Martin</Description>
        <UnitofMeasure>Hour</UnitofMeasure>
        <Quantity>4</Quantity>
     </Row>
  </Data>
</ServiceLine>

<WorkDate>August 1, 2007</WorkDate>

</Object>
```

*FIG. 8C*

```xml
<?xml version="1.0" encoding="UTF-8" standalone="yes"?>
<?mso-application progid="Word.Document"?>

<w:wordDocument
 xmlns:o="urn:schemas-microsoft-com:office:office"
 xmlns:v="urn:schemas-microsoft-com:vml"
 xmlns:w="http://schemas.microsoft.com/office/word/2003/wordml">

<w:body>
    <w:pict><v:imagedata src="wordml://02000001.jpg" o:title="contoso logo"/></w:pict>
    <w:hlink>
        <xsl:attribute name="w:dest">url://datasource/form1</xsl:attribute>
        <xsl:attribute name="w:screenTip">Link to Microsoft Dynamics NAV</xsl:attribute>
        Service Item Worksheet Pick List
    </w:hlink>
    <xsl:value-of select="Object/WorkDate"/>

<w:tbl>
        <w:tr>
            <w:tc>Customer Name</w:tc>
            <w:tc>The Cannon Group PLC</w:tc>
            <w:tc>Document No.</w:tc>
            <w:tc>SO000001</w:tc>
        </w:tr>
        <w:tr>
            <w:tc>Address</w:tc>
            <w:tc>192 Market Square</w:tc>
            <w:tc>Service Item No.</w:tc>
            <w:tc>7</w:tc>
        </w:tr>
        <w:tr>
            <w:tc>City</w:tc>
            <w:tc>Birmingham</w:tc>
            <w:tc>Item No.</w:tc>
            <w:tc>80007</w:tc>
        </w:tr>
        <w:tr>
            <w:tc>Country</w:tc>
            <w:tc>GB</w:tc>
            <w:tc>Serial No.</w:tc>
            <w:tc>AS764789</w:tc>
        </w:tr>
        <w:tr>
            <w:tc>Contact</w:tc>
            <w:tc><Mr. Andy Teal</w:tc>
            <w:tc>Service Shelf No.</w:tc>
            <w:tc></w:tc>
        </w:tr>
    </w:tbl>
    <w:tbl>
        <w:tr>
            <w:tc>Type</w:tc>
            <w:tc>No.</w:tc>
            <w:tc>Description</w:tc>
            <w:tc>Location Code</w:tc>
            <w:tc>Unit of Measure</w:tc>
            <w:tc>Quantity</w:tc>
        </w:tr>
        <w:tr>
            <w:tc></w:tc>
            <w:tc>80202</w:tc>
            <w:tc>Chip 32 MB</w:tc>
            <w:tc></w:tc>
            <w:tc>Piece</w:tc>
            <w:tc>1</w:tc>
        </w:tr>
        <w:tr>
            <w:tc>Resource</w:tc>
            <w:tc>LINDA</w:tc>
            <w:tc>Linda Martin</w:tc>
            <w:tc>BLUE</w:tc>
            <w:tc>Hour</w:tc>
            <w:tc>4</w:tc>
        </w:tr>
    </w:tbl>
</w:body>
</w:wordDocument>
```

*FIG. 8D*

GRAPHICAL CREATION OF A DOCUMENT CONVERSION TEMPLATE

CROSS REFERENCE TO RELATED APPLICATION

This application is a continuation application of U.S. patent application Ser. No. 11/864,308, filed on Sep. 28, 2007, and entitled "GRAPHICAL CREATION OF A DOCUMENT CONVERSION TEMPLATE," which is incorporated herein in its entirety by reference.

BACKGROUND

Extensible Style Sheet Language (XSL) is an Extensible Markup Language (XML)-based language used for the transformation of XML documents using XSL Transformation (XSLT) style sheets. XSLT style sheets are designed to transform XML documents into new XML or "human-readable" documents. The new document may be in standard XML syntax or in another format, such as HTML, plain text, word processing documents, or spreadsheets. The XSLT processing model involves one or more XML source documents, one or more XSLT style sheets, an XSLT template processing engine (the processor), and one or more result documents. The XSLT processor ordinarily inputs two files—an XML source document and an XSLT style sheet—and outputs a result document. The XSLT style sheet contains the XSLT program text (or "source code" in other languages) and is itself an XML document that describes a collection of template rules: instructions and other hints that guide the processor toward the production of the result document by emitting elements of the desired output format. The following table provides a simple example of an input XML document, an XSLT style sheet, and a resulting output document.

Sample XML source document:

```
<?xml version="1.0" ?>
    <persons>
        <person username="JS1">
            <name>John</name>
            <family_name>Smith</family_name>
        </person>
        <person username="MI1">
            <name>Morka</name>
            <family_name>Ismincius</family_name>
        </person>
    </persons>
</xml>
```

Sample XSLT style sheet that provides templates to transform the XML source document:

```
<?xml version="1.0" ?>
    <xsl:stylesheet xmlns:xsl="http://www.w3.org/1999/XSL/Transform" version="1.0">
        <xsl:output method="xml" indent="yes"/>
        <xsl:template match="/">
            <root> <xsl:apply-templates/> </root>
        </xsl:template>
        <xsl:template match="//person">
            <name username="{@username}">
                <xsl:value-of select="name" />
            </name>
        </xsl:template>
    </xsl:stylesheet>
</xml>
```

Sample XML result document:

```
<?xml version="1.0" encoding="UTF-8"?>
    <root>
        <name username="JS1">John</name>
        <name username="MI1">Morka</name>
    </root>
</xml>
```

XSLT relies upon the XPath language for identifying subsets of the source document, as well as for performing calculations. The XPath language provides various methods of referring to elements or nodes of the XML source document, which are hierarchically organized as a tree. The XSLT language is declarative—rather than listing an imperative sequence of actions to perform in a stateful environment, template rules within the XSLT style sheet define how to handle a node matching a particular pattern specified using XPath. If the processor encounters a matching node in the source document, the processor applies the template rule. The processor typically builds a source tree from the XML source document and then starts by processing the source tree's root node, finding the best-matching template for that node in the XSLT style sheet, and evaluating the template's contents. Instructions of each template rule generally direct the processor to either create nodes in the result tree or process more nodes in the source tree in the same way as the root node. Output is derived from the result tree.

XSLT is a very powerful tool for converting data from one format to another. One field where data conversion can be used is Enterprise Resource Planning (ERP) systems. ERP refers to the integration of the data and processes of an organization into a unified system. ERP systems typically contain one or more modules for tasks such as order entry, accounting, human resources, marketing, and so forth. Most ERP systems use a unified database to store data for the various system modules. The introduction of an ERP system to replace two or more independent applications eliminates the need for external interfaces previously required between the applications, and provides additional benefits that range from standardization and lower maintenance (one system instead of two or more) to easier reporting and/or greater reporting capabilities (as all data is typically kept in one database). However, because of the custom nature of ERP systems, it is often useful to extract the data stored in the database for use in other common applications. For example, a user may want to create documents based on ERP data that can be viewed or edited using a familiar word processing application or spreadsheet program. The word processing program may provide superior capabilities for formatting and laying out text. Thus, by exporting the data from the ERP system to the other application, the user gains the benefits of both the unified ERP system and the capabilities of the other application.

XSLT is a good choice for extracting data from an ERP system into a format that is understandable by another application. Microsoft Dynamics NAV is one example of an ERP system that accepts an XSLT style sheet for this purpose. Before the user can extract data from the ERP system, the user typically creates an XSLT style sheet that describes how the data is to be converted. Unfortunately, the creation of an XSLT style sheet is a very cumbersome process that requires a skilled web/XML developer. Many smaller organizations may not have anyone with the skills to create an XSLT style sheet and may have to hire costly consultants. In addition, the tools available are very limited, such as standard text editors and basic hierarchical XML viewers. There are no graphical and user-friendly tools to create XSLT style sheets.

SUMMARY

A template creation system provides a graphical and user-friendly method for a user to create an XSLT style sheet. The template creation system enables a graphical selection of one or more fields from within a database system. The template creation system identifies a source format of the selected fields that can be exported from the database system. The template creation system identifies a target format readable by a document editing system. For example, the document editing system may be a word processing application that stores files in an application-specific format. The template creation system creates one or more template rules based on the identified source and target formats for converting the data from the source format to the target format. The template rules may then be stored in an XSLT style sheet. Thus, the template creation system provides a graphical and user-friendly tool for the user to convert data from one system to another.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A through 4D illustrate display pages of the template creation system for configuring options related to exporting data in one embodiment.

FIGS. 8A-8D illustrate selected portions from example files used by the template creation system in one embodiment.

DETAILED DESCRIPTION

Overview

Figure 1:
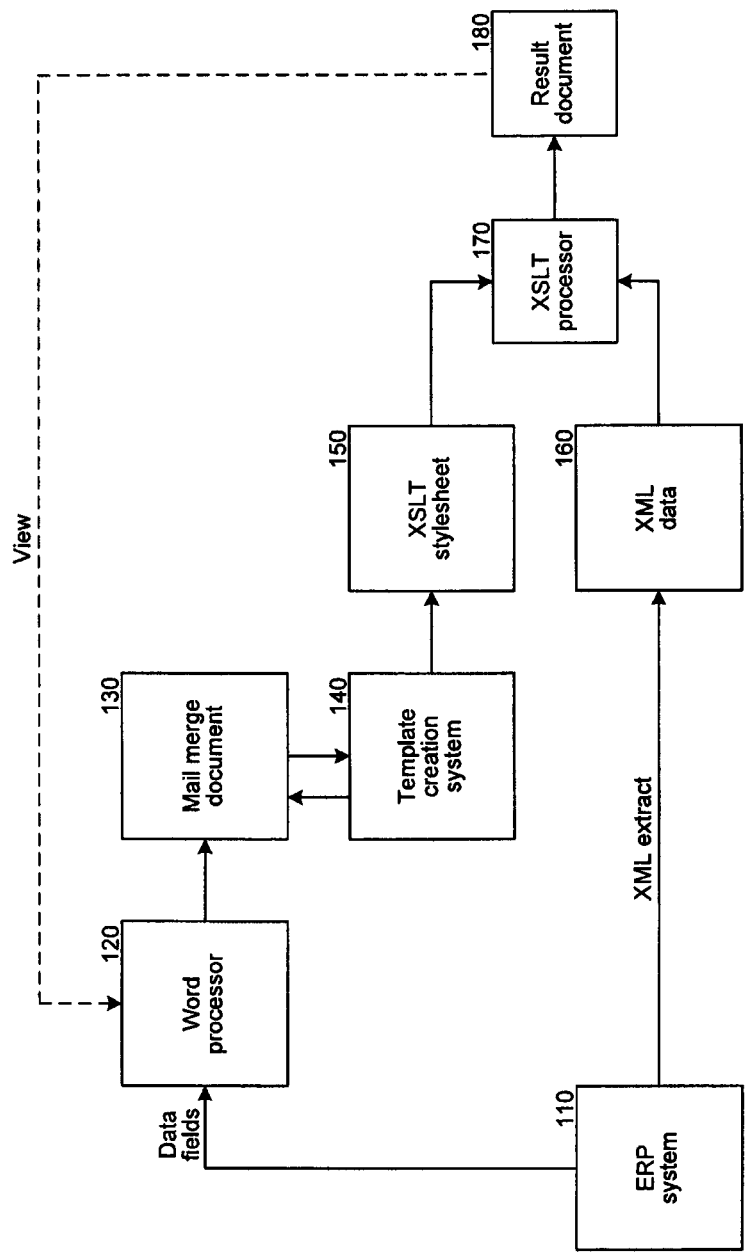
FIG. 1 is a block diagram that illustrates the processing performed by a template creation system in one embodiment.

A template creation system that provides a graphical and user-friendly method for creating an XSLT style sheet is described herein. The template creation system enables a graphical selection of one or more fields from within a database system. For example, the database system may be an ERP system that provides a graphical interface for selecting fields of data to be exported. The ERP system provides the selected fields as a data source to a document editing system (e.g., a word processing or spreadsheet application) that accepts data from external data sources. For example, a user may use a word processing application with a mail merge function to incorporate the fields provided by the ERP system into a document. The user can then use the document editing system to graphically lay out the fields in a particular format using familiar document editing functions. For example, the user may bold a particular field, justify the text of a field, place a field in a table, and so forth. After the user has created a document that describes the desired format for the data, the template creation system creates one or more template rules that convert data exported from the database system to the format of the document created by the user in the document editing system. As an example, Microsoft Word stores files in either a proprietary DOC format or in an XML format that uses application-specific Word Markup Language (WordML) elements. The template creation system may create template rules to convert the generic XML file of the ERP system to WordML statements readable by Microsoft Word. The template rules may then be stored in an XSLT style sheet. Thus, the template creation system provides a graphical and user-friendly way for the user to convert data from one system to another. With this tool, the user can set up a new XSLT style sheet in minutes—without having any other skills than some end-user knowledge of a document editing system. Later, the user can provides the created XSLT style sheet to the database system and export data from the database system in the format desired by the user.

System Description

In some embodiments, the template creation system receives formatting preferences from the user used when converting data. For example, the user may use a word processing application to specify the layout of fields selected for conversion. The word processing application may provide tables, text alignment (e.g., left, center, justify), and other formatting functions that are not available from the database system. The template creation system receives these formatting preferences in the mail merge document and conforms data exported from the database system to the format of the mail merge document using the template rules stored in an XSLT style sheet.

In some embodiments, the template creation system emits template rules for creating WordML statements from XML data. WordML is a variation of XML used by Microsoft Word that describes the elements of a Word document. For example, WordML provides elements for specifying the font for text, the formatting of paragraphs, and so forth. The template creation system may receive a mail merge document saved as XML that contains WordML statements or tags, and emit template rules for creating similar WordML statements in an XSLT style sheet for converting data from the database system. For example, if the database contains a first name and last name for users of a system, the WordML statements may place the first name and last name in a table with bold text. When the user exports a particular list of first and last names from the database system, the XSLT style sheet created by the template creation system produces an XML file with WordML that places the exported names in the requested format.

FIG. 1 is a block diagram that illustrates the processing performed by the template creation system in one embodiment. An ERP system 110 or other database system exports data fields that are available to a word processor 120 or other document editing system. A user uses the word processor 120 to create a mail merge document 130 that contains references to the data fields exported by the ERP system 110. For example, the word processor 120 may provide a mail merge function that allows a user to create a mail merge document that specifies the location and format of fields from a data source, such as the ERP system 110. The user uses familiar features within the word processor 120 to create the mail merge template. The template creation system 140 receives information about the exported fields from the ERP system and converts the mail merge document created by the user into an XSLT style sheet 150. For example, if the mail merge document 130 is a Microsoft Word XML document containing WordML tags that specify the layout and format of the data fields, then the template creation system 140 creates an XSLT style sheet for converting data exported from the ERP system 110 into a Microsoft Word document having the specified layout and format. Data 160 exported from the ERP system 110 is input into an XSLT Processor 170 along with the created XSLT style sheet 150 to create a result document 180. The user may then view the result document 180 using the word processor 120 or another application.

In some embodiments, the template creation system provides dynamic fields when a user converts data that describe the conversion process. For example, the template creation system may allow the user to select a "work date" field that specifies the date that the exported data pertains to, which is then exported from the database system. For example, the database system may provide a date for checks that specifies the date the checks should post, and the work date provides that date to the template creation system through the work date field. By using this field, the user can include the date of the export in the resulting document file. Although this field is not a part of the data stored in the database, the database system can easily determine the value of this field when a request to export data is received, and the template created by the template creation system can provide for the conversion of these dynamic fields just like other fields.

In some embodiments, the template creation system provides the ability to export data links that reference data stored in the database system. Rather than placing a data field in a document, a user may want to insert a reference to that data field so that following the link will provide the freshest version of the data. For example, the user may have a form used in an ERP system that contains additional data that the user does not want to include in a document based on ERP data. However, the user can provide a link to the ERP system form so that readers of the document can follow the link for additional information.

In some embodiments, the template creation system provides additional data for identifying errors when exporting data. For example, if an ERP system creates an XML data file of exported data that the template creation typically deletes when the data is converted using an XSLT style sheet, then the template creation system may provide an option to keep the data file so that it can be inspected to debug problems in the conversion process. In addition, the template creation system may provide an option to enable the system to display additional status information at various stages of the export process to help a user identify errors.

Figures

The following figures provide example embodiments of the features described above.

Figure 2:
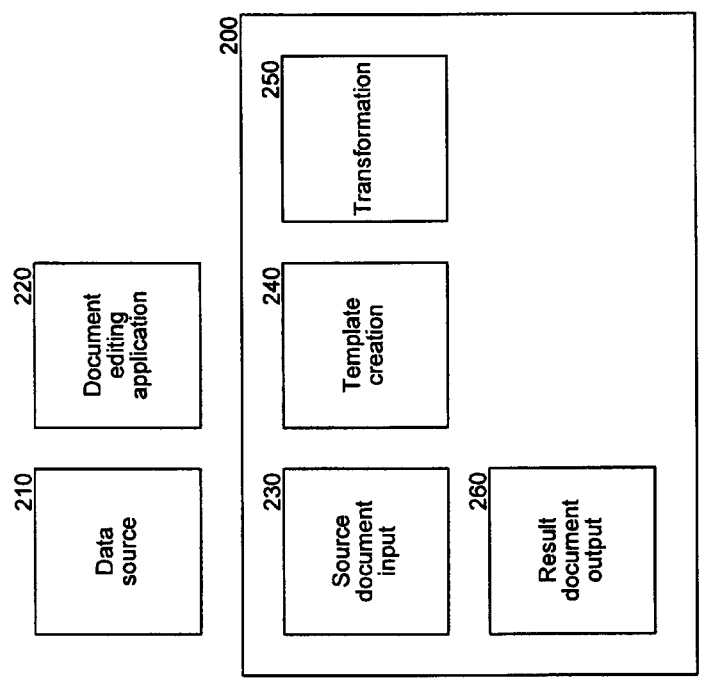
FIG. 2 is a block diagram that illustrates the components of the template creation system in one embodiment.

FIG. 2 is a block diagram that illustrates the components of the template creation system in one embodiment. The template creation system 200 receives data from a data source 210 and creates a template for exporting the data in a format viewable by a document editing application 220. For example, the data source 210 may be an ERP system, and the document editing application 220 may be a word processing application. The template creation system 200 contains a source document input component 230, a The template creation system 200 contains a source document input component 230, a template creation component 240, a transformation component 250, and a result document output component 260. The template creation component 240 receives a document created using the document editing application 220 that contains references to fields of data available from the data source 210 and the layout and/or format that the user wants to apply to data. The template creation component 240 creates rules for converting the data from the data source 210 into the format specified by the document. The template creation component 240 may store the rules in a conversion template, such as an XSLT style sheet.

The source document input component 230 receives data exported from the data source 210. The data from the data source 210 may not contain any special formatting and may simply be raw data exported in a generic format from the data source 210. The transformation component 250 applies the rules of the conversion template to convert data received by the source document input component 230 to a format similar to the document created using the document editing application 220. The result document output component 260 creates an output document from the data transformed by the transformation component 250. For example, the output document may be a word processing document viewable using the document editing application 220.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
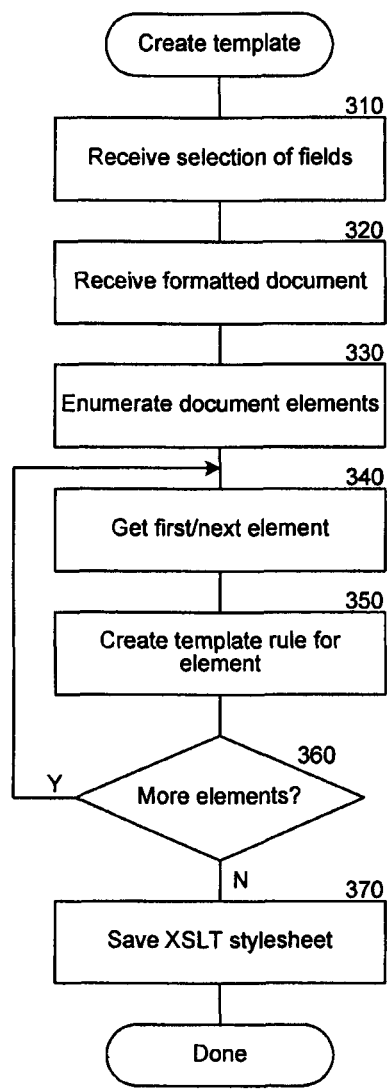
FIG. 3 is a flow diagram that illustrates the processing of the template creation system in one embodiment.

FIG. 3 is a flow diagram that illustrates the processing of the template creation system in one embodiment. In block 310, the system receives a selection of fields that are available for export, such as from a database system. For example, an ERP system may provide the ability to export data by selecting fields. In block 320, the system receives a formatted document created by a user that contains references to at least some of the selected fields. For example, the user may select fields exported from the ERP system using a word processing application mail merge function. The user may also provide formatting and layout instruction for the fields by graphically laying them out within the word processing application. In block 330, the system enumerates elements without the formatted document. For example, the formatted document may be an XML document containing WordML or other elements that describe the format of the document. As an example, the system may search for elements containing the text "MERGEFIELD" or for tags of type "fldSimple," "fldChar," and so forth (see FIG. 8A).

In block 340, the system selects the first element. In block 350, the system creates a template rule for placing fields exported from the database system into the format specified by the formatted document. For example, the system may determine what transformations need to be performed on the source data to produce a particular output format, such as a word processing document or spreadsheet. The system may create rules for converting fields exported from the ERP system to elements that are readable by the word processing application. In decision block 360, if the formatted document contains additional elements, then the system loops to block 340 to select the next element, else the system continues at block 370. In block 370, the system stores the template rules in an XSLT style sheet or other document conversion template. The system can later use the created XSLT style sheet to export data from the ERP system in a format readable by a document editing application. After block 370, these steps conclude.

Figure 4A:
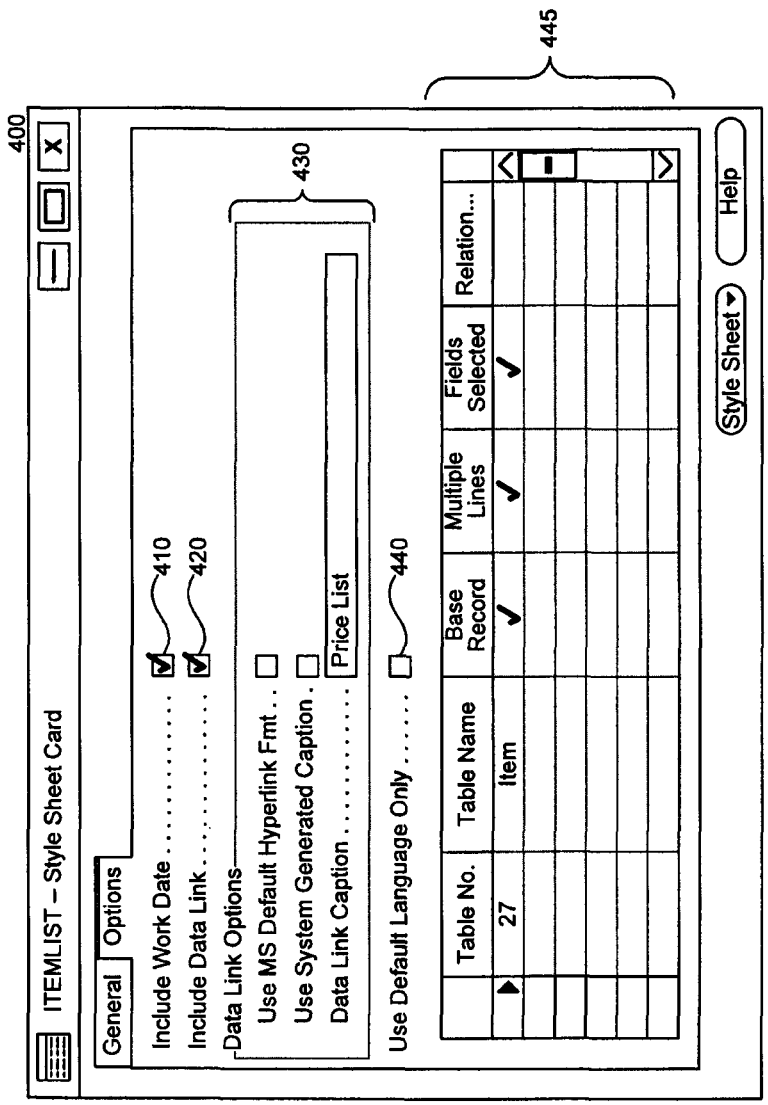

FIGS. 4A-4D illustrate display pages of the template creation system for configuring options and selecting fields related to exporting data in one embodiment. FIG. 4A is an options dialog 400 that contains two dynamic field types that the user can include in the exported data. For example, the options dialog 400 contains an include work date option 410 that the user can select to include a field specifying the date that the exported data pertains to, which is exported in the list of fields available for conversion to a format for an external document editing application. The options dialog 400 also contains an include data link option 420 that specifies that a link to the original form from which data is being exported should be included along with the exported data fields. The link options 430 specify the type of the data link, such as whether the link is in a default format, whether the system generates a caption for the data link, and a name for the exported data link field. In addition, the options dialog 400 includes a language option 440 for specifying whether a default language should be used for exported data captions rather than the native language of the data captions. For example, an order number field may have a caption "Order No." in English and a translated version for other languages.

Figure 4B:
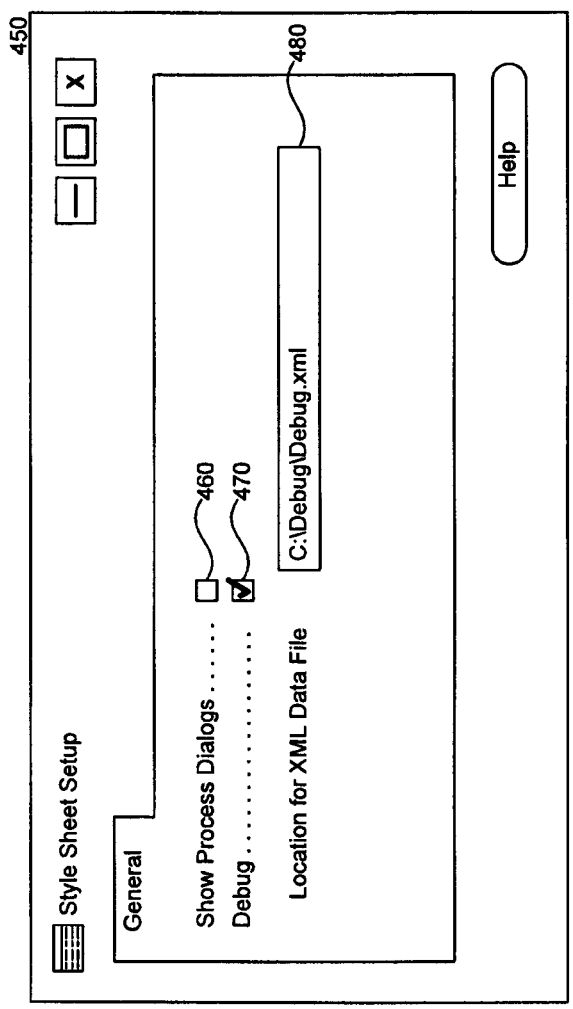

FIG. 4B illustrates another options dialog 450. The option dialog 450 allows the user to configure debugging options when exporting data from a database system. For example, the user can select a show process dialogs option 460 to cause the template creation system to display additional information during the process of exporting data. In addition, the user can select a debug option 470 to cause the system to provide debugging information. For example, the user can specify a location 480 to which the source XML data file should be copied when converting XML data.

Figure 4C:
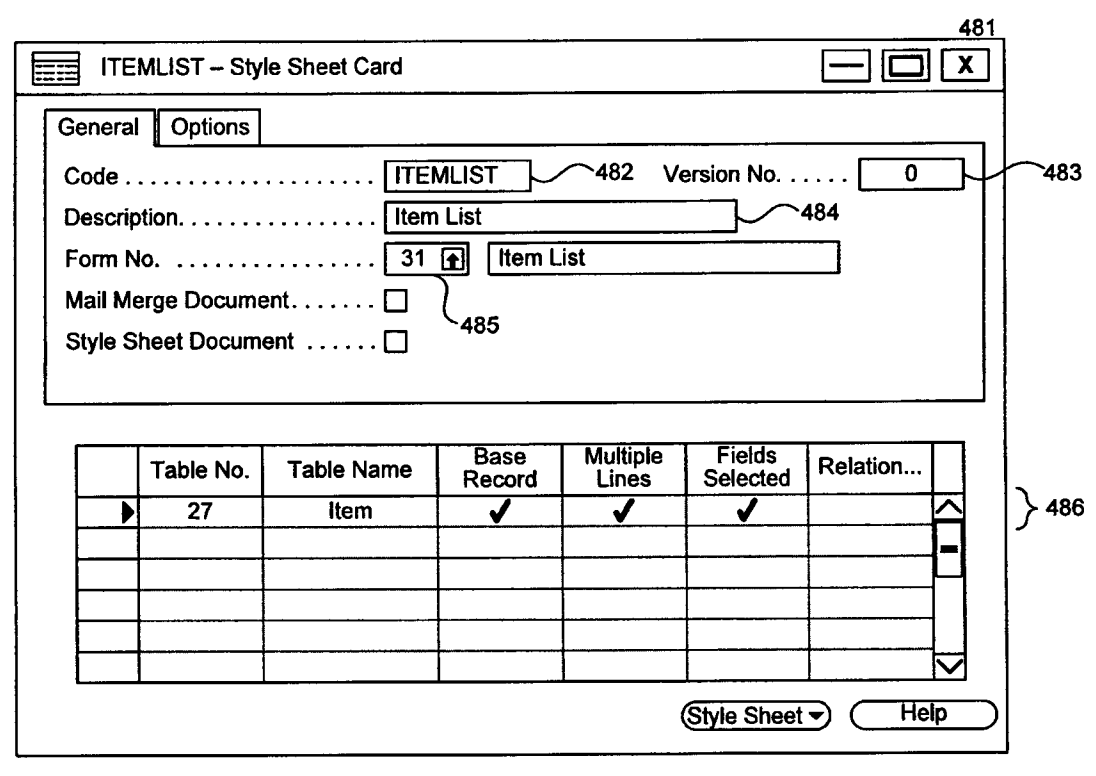
Figure 4D:
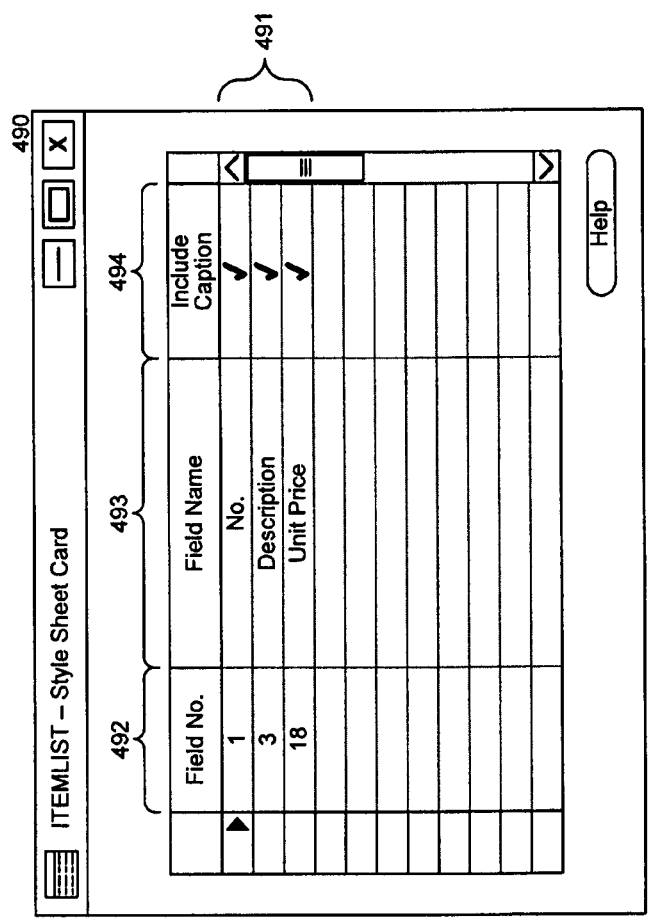

FIG. 4C illustrates a display page for selecting fields to be exported from the database system in one embodiment. The display page 481 receives information about the exported fields, such as a code 482 with which to identify the fields, a version number 483 that is incremented when the style sheet changes, a description 484, and a form number 485, and so on. The display page 481 also includes a list 486 of tables from which to include fields. FIG. 4D illustrates a display page 490 that lists the fields being exported from the selected tables. The display page 490 contains a list 491 of the fields. The columns of the list include the field number 492, the name of the field 493, and a checkbox 494 indicating whether the database system should export a caption describing the field when exporting data. The fields selected could come from multiple tables, and could include data that is not available in a form associated with the table. The field selection process allows the user to merge data from multiple tables into one place for exporting into a new document. The field selection process also allows the user to overcome certain limitations of external applications. For example, some word processing applications only allow 255 fields to be used in a mail merge document. By selecting only those fields that are relevant to the documents being created, a user can keep the number of exported fields within such limits.

Figure 5:
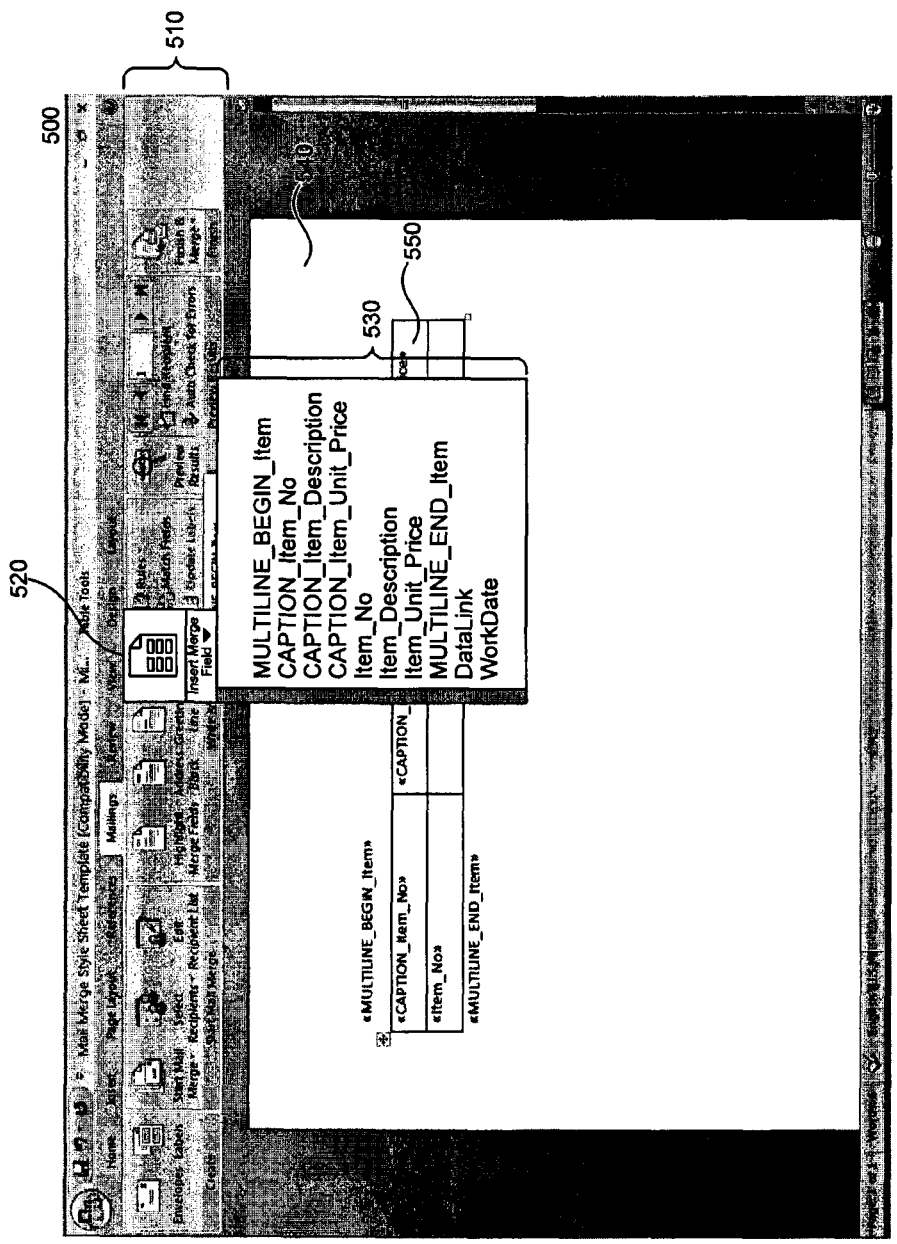
FIG. 5 illustrates a display page of a word processing application for graphically creating a template for exporting data in one embodiment.

FIG. 5 illustrates a display page of a word processing application for graphically creating a template for exporting data in one embodiment. The display page 500 contains a ribbon bar 510. The ribbon bar 510 contains an insert merge field button 520 that allows a user to insert fields from a data source to create a mail merge document. The template creation system uses the preexisting mail merge feature of the word processing application to provide a familiar environment to the user in which to select fields that will be included when exporting data from the database system. When the user presses the insert merge field button 520, the word processing application displays a list of fields 530. The word processing application can access a variety of standard data sources (such as through ActiveX Data Objects (ADO) or Open Database Connectivity (ODBC)) to enumerate fields, and the database system provides a list of fields as a standard data source that the word processing application can access. The user uses the word processing application to create a document 540 containing formatted fields 550.

Figure 6:
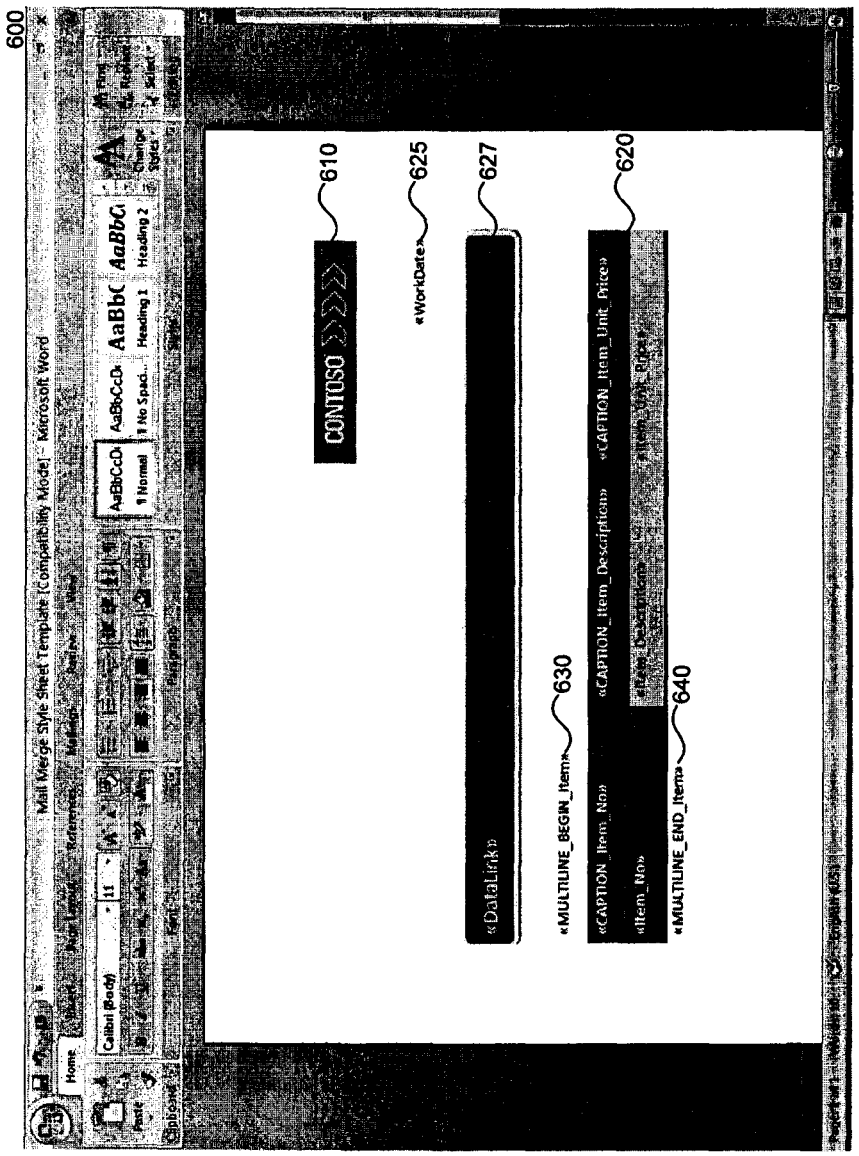
FIG. 6 illustrates a display page of the word processing application after the user has finished creating a template for exporting data in one embodiment.

FIG. 6 illustrates a display page of the word processing application after the user has finished creating a template for exporting data in one embodiment. The display page 600 contains formatting that may not be available from the database system. For example, the display page 600 contains an image 610 and table 620. By exporting data to the word processing application using a created template, the template creation system allows the user to use the rich display features of the word processing application to display the data stored in the database system. The display page 600 also illustrates the insertion of dynamic fields 625 and 627 into the document as well as multiline data. Multiline data is data that, when exported, will contain multiple similar items repeated. The display page 600 contains a multiline begin field 630 and a multiline end field 640 that demarks where the multiline data will be displayed. The template creations system displays each of the fields between the multiline begin and end fields for each item in the exported data, except for the first row of fields, which is treated as header data and displayed once.

Figure 7:
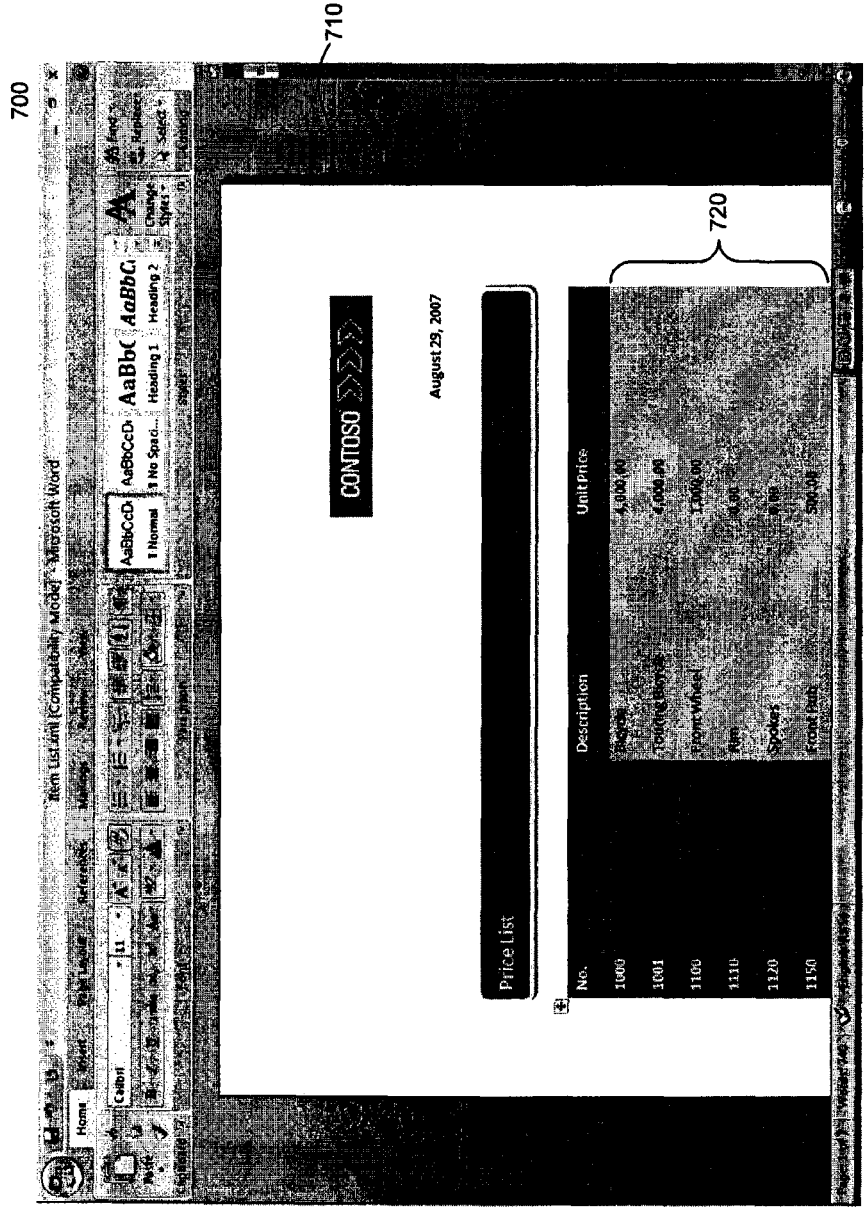
FIG. 7 illustrates a display page of the word processing application containing exported data converted using a created template in one embodiment.

FIG. 7 illustrates a display page of the word processing application containing exported data converted using a created template in one embodiment. The display page 700 illustrates the resulting document 710 created by the template creation system after data is exported from the database system. The document 710 is created from a template that was created from mail merge fields like the ones displayed in FIG. 6. The document 710 contains a list of data 720 that matches up with the fields that the user laid out in the document of FIG. 6. Thus, the template creation system allows the user to work in a familiar word processing application to create a template for exporting data from a database application using style sheets.

FIGS. 8A-8D illustrate selected portions from example files used by the template creation system in one embodiment.

The files have been edited to remove extra tags for clarity of depicting the operation of the illustrated embodiments. FIG. 8A is a Microsoft Word 2003 mail merge document saved as an XML file. The document is in a typical markup language format, and contains tags for defining the location of images (e.g., <w:pict>), tables (e.g., <w:tbl>), and merge fields (e.g., <w:fldSimple>). As described above, the user creates this file using a standard word processing application. Then, the template creation system converts this file into an XSLT style sheet or other template that can be used to convert input data.

FIG. 8B is an example XSLT style sheet produced by the template creation system from the document of FIG. 8A. FIG. 8B is similar to FIG. 8A. However, in FIG. 8B each of the mail merge fields has been replaced by an appropriate XPath statement that references an XML data file exported by a database system, such as the one in FIG. 8C. For example, the template creation system has replaced the merge field "SH_Bill-to_Name" in FIG. 8A with the XSL tag "<xsl:value-of select="Object/ServiceHeader/Data/BilltoName"/> in FIG. 8B. When passed to an XSLT processor, this tag will cause the processor to search the input XML data file for a tag "BilltoName" at the specified location in the XML hierarchy (i.e., "Object/ServiceHeader/Data"), and place the value found there in the resulting output data file. The resulting output data file is a file containing data from the database system that has the formatting of the word processing document of FIG. 8A.

FIG. 8C is an example input data file containing data exported from a database system. The template creation system converts this data to a new format based on the instructions in the XSLT style sheet of FIG. 8B.

FIG. 8D is an example result document produced by an XSLT processor when the input data file of FIG. 8C is processed using the XSLT style sheet of FIG. 8B.

CONCLUSION

From the foregoing, it will be appreciated that specific embodiments of the template creation system have been described herein for purposes of illustration, but that various modifications may be made without deviating from the spirit and scope of the invention. For example, although XSLT style sheets have been used as an example of a template format, other document conversion standards and methods can be used with the system described here. In addition, although word processors and spreadsheets have been used as examples of target applications to which to export data, many applications are available and can be used with the methods herein. Accordingly, the invention is not limited except as by the appended claims.

We claim:

1. A computer-readable storage device encoded with instructions for controlling a computer system to create a document based on fields of data of an enterprise resource planning system, by a method comprising:
   receiving a user-created document containing a reference to a field of data stored by the enterprise resource planning system and containing a source format of the field and a target display format of the field, the user-created document specifying a target layout that indicates a location of the field within the document;
   creating a template rule based on the source format of the field and the target display format of the field;
   receiving data for the field exported from the enterprise resource planning system; and
   generating the document based on the received data in accordance with the user-created document, the generating including applying the template rule to the received data to convert the received data from the source format to the target display format and to position the converted data in the document at the location indicated by the user-created document.

2. The computer-readable storage device of claim 1 wherein the user-created document is a mail merge document generated by a document editing system.

3. The computer-readable storage device of claim 2 wherein the generating of the mail merge document includes:
   receiving from a user a graphical selection of the field of data stored by the enterprise resource planning system;
   identifying a source format of the selected field that can be exported from the enterprise resource planning system; and
   receiving from the user a specification of the target layout.

4. The computer-readable storage device of claim 1 wherein the user-created document contains a merge field at the location identified by the user as a destination for the field of data.

5. The computer-readable storage device of claim 1 wherein the user-created document contains an area that defines repeating lines for each row of data exported by the enterprise resource system.

6. The computer-readable storage device of claim 1 wherein creating the template rule comprises receiving configuration options from the user that determine how the template rule is created.

7. The computer-readable storage device of claim 6 wherein the configuration options include an option for receiving debugging information from the computer system.

8. The computer-readable storage device of claim 1 wherein creating the template rule comprises creating an XSLT style sheet.

9. The computer-readable storage device of claim 1 including displaying a display page for selecting fields to be exported from the enterprise resource planning system.

10. The computer-readable storage device of claim 1 including displaying a display page for selecting to include a dynamic field with the field to be exported from the enterprise resource planning system.

11. The computer-readable storage device of claim 10 wherein the dynamic field is date of the exported data.

12. The computer-readable storage device of claim 10 wherein the dynamic field is a link to a form from which the data is being exported.

13. The computer-readable storage device of claim 1 including displaying a display page for identifying the field by code and form number.

14. A system for creating a document based on fields of data of an enterprise resource planning system, comprising:
   a memory storing computer-executable instructions of:
      a component that receives data exported from the enterprise resource planning system
      a component that
         receives a user-created template document containing references to fields stored by the enterprise resource planning system and containing, for each field, a source format and a target display format that is viewable by a document editing application, the user-created template document specifying a target layout that indicates locations of the fields within the document; and
         creates template rules based on the source format and the target display format of the fields
      a component that generates the document in accordance with the user-created template document, the generating including applying the template rules to the exported data to convert the data from the source formats to the target display formats and to position the converted data in the document based on the locations indicated in the user-created template document; and a processor that executes the computer-executable instructions stored in the memory.

15. The system of claim 14 wherein the user-created document is a mail merge document generated by a document editing system.

16. The system of claim 15 wherein the document editing system includes:

a component that receives from a user a graphical selection of fields of data stored by the enterprise resource planning system;

a component that identifies source formats of the selected fields that can be exported from the enterprise resource planning system; and a component that receives from the user the specification of the target layout.

17. The system of claim 14 including a component that displays a display page for selecting fields to be exported from the enterprise resource system.

18. A method performed by a computing device for a document based on fields of data of an enterprise resource planning system, the fields having source formats, the method comprising:

providing a user-created document containing references to fields of data stored by the enterprise resource planning system and containing target display formats of the fields;

creating template rules based on the source formats and the target display formats of the fields;

receiving data for the fields exported from the enterprise resource planning system; and generating the document in accordance with the user-created document, the generating including applying the template rules to the received data to convert the received data from the source formats to the target display formats and to position the converted data in the document based on locations indicated in the user-created document.

19. The method of claim 18 wherein the user-created document is a mail merge document generated by a document editing system.

20. The method of claim 19 wherein the generating of the mail merge document includes:

receiving from a user a graphical selection of the fields of data stored by the enterprise resource planning system; and receiving from the user the specification of locations of the fields within the document.

\* \* \* \* \*